United States Patent [19]

Bricheno et al.

[11] Patent Number: 4,756,589

[45] Date of Patent: Jul. 12, 1988

[54] OPTICAL COUPLER UTILIZING LOW OR ZERO BIREFRINGENCE OPTICAL FIBERS AND A METHOD OF MAKING SAME

[75] Inventors: Terry Bricheno, Great Sampford; Vernon Baker, Harlow, both of United Kingdom

[73] Assignee: STC plc, London, England

[21] Appl. No.: 819,125

[22] Filed: Jan. 15, 1986

[30] Foreign Application Priority Data

Feb. 12, 1985 [GB] United Kingdom ............ 8503506

[51] Int. Cl.$^4$ .................... G02B 6/26; C03B 23/20
[52] U.S. Cl. .................... 350/96.15; 350/96.29; 350/96.30; 350/320; 65/3.11; 65/4.1; 65/4.2
[58] Field of Search ............ 350/96.10, 96.15, 96.16, 350/96.20, 96.29, 96.30, 320; 65/3.11, 4.1, 4.2; 156/157, 158, 166

[56] References Cited

U.S. PATENT DOCUMENTS

| | | | |
|---|---|---|---|
| 4,377,403 | 3/1983 | McLandrich | 65/3.11 |
| 4,591,372 | 5/1986 | Bricheno et al. | 350/96.15 |
| 4,612,028 | 9/1986 | Abebe et al. | 65/4.2 |
| 4,615,582 | 10/1986 | Lefevre et al. | 350/96.29 |
| 4,632,513 | 12/1986 | Stowe et al. | 350/320 |
| 4,647,146 | 3/1987 | Karr, III et al. | 350/96.15 |

FOREIGN PATENT DOCUMENTS

| | | | |
|---|---|---|---|
| 0038023 | 10/1981 | European Pat. Off. | 350/96.15 |
| 0079196 | 5/1983 | European Pat. Off. | 350/96.15 |
| 0078140 | 5/1983 | European Pat. Off. | 350/96.15 |
| 0093460 | 11/1983 | European Pat. Off. | 350/96.15 |
| 2059093 | 4/1978 | United Kingdom | 350/96.15 |
| 2124403 | 2/1984 | United Kingdom | 350/96.15 |

OTHER PUBLICATIONS

Barlow et al., "Birefringence and Polarization Mode-dispersion in Spun Single Mode Fibers" *Applied Optics* vol. 20, No. 17 9/81 pp. 2962–2968.

Payne et al., "Development of Low and High Birefringence Optical Fibers" *IEEE J. of Quant. Elect.* vol. QE-18 No. 4 4/82 pp. 477–487.

T. Bricheno and A. Fielding, "Stable Low-Loss Single-Mode Couplers", *Electronics Letters*, 15th Mar. 1984, vol. 20, No. 6, pp. 230–232.

*Primary Examiner*—William L. Sikes
*Assistant Examiner*—Brian M. Healy
*Attorney, Agent, or Firm*—Kerkam, Stowell, Kondracki & Clarke

[57] ABSTRACT

Polarization beam splitters/combiners or polarization insensitive beam splitters/combiners are manufactured from low or zero birefringence single mode optical fibre, rather than high birefringence fibre, by using a differential pulling technique to induce the appropriate amount of form birefringence, the fibres being stretched further than hitherto.

8 Claims, 5 Drawing Sheets

OPTICAL COUPLER UTILIZING LOW OR ZERO BIREFRINGENCE OPTICAL FIBERS AND A METHOD OF MAKING SAME

BACKGROUND OF THE INVENTION

This invention relates to optical fibres and in particular to their use in all-fibre devices such as single mode fibre directional couplers.

PRIOR ART

Fused single mode fibre directional couplers are known and may comprise a pair of fibres which are twisted together and then fused together over a coupling length using, for example, a biconical taper technique. Such a coupler may be manufactured from standard production MCVD fibre, see for example "Stable low-loss single-mode couplers" by T. Bricheno and A. Fielding, Electron.Lett; 1984. 20. p 230–232. As described therein the fused biconical taper technique basically comprises stripping two fibres of their primary and secondary coatings over a central region, typically 70 mm long, twisting the fibres together and mounting each end of the twisted arrangement in a respective grooved block attached to respective motorised lead screw. Light was coupled from a suitable semiconductor laser into one fibre arm (an input port) via a cladding mode stripper which suppressed cladding light by 25 dB. The output part of the coupler were fed by more cladding mode strippers to matched detectors and the signals monitored on a ratiometer. The twisted fibres are heated in a flame and the blocks driven apart, thereby elongating the fibres at the twisted region and producing the biconical taper.

The original method of making such a coupler involved symmetrically pulling the coupler ends away from one another in order to achieve the required extension and coupling. The rapidity of onset of coupling makes this conventional method of making a coupler difficult to control in such a way as to terminate the drawing (extension) operation at the required end point.

In our co-pending GB application No. 8331950, corresponding to Bricheus et al U.S. application Ser. No. 675,559, filed Nov. 28, 1984 now U.S. Pat. No. 4,591,372 there is described a so-called differential pulling technique which greatly improved control of the end point. The differential pulling technique also involves clamping the ends of the twisted together fibres 30,31 (FIG. 1) in respective blocks 32,33 attached to respective lead screws (not shown). The blocks 32,33 are however driven in the same direction 37 but at slightly different speeds. The leading block is always driven slightly faster than the trailing block so that the fibres are subjected to a progressive extension as they are scanned through the flame of a microtorch 34. Several passes may be required in order to produce the required amount of coupling. This may be achieved by reversing the rotational sense of the lead screws and their relative rotational rates at the end of each traverse through the flame. Thus successive traverses take place in opposite directions. A convenient way of monitoring the extension process is to position, before the start, a pointer 35,36 on each block so that they meet in the plane of the microtorch flame. At the end of the first traverse, assumed to be in the direction of arrow 37, the tips of the two pointers will have moved apart and the pointer 35 will intersect the plane of the microtorch. On the second traverse the flame reaches the end of the reduced diameter portion produced by the first traverse when the tip of pointer 36 again reaches the plane of the microtorch.

The manufacturing process is monitored by directing light of a particular wavelength into one end of one of the fibres and observing the changes in light output from the other end of either or both fibres as the extension proceeds. Light launched into one end of one fibre (fibre A-FIG. 2) is initially transferred virtually exclusively to the output from fibre A because the coupling is too weak for there to be any appreciable transfer of power into the second fibre (fibre B). Then as the extension proceeds, and the coupling gets stronger, the output from fibre A decreases while there is a corresponding increase in the power output from fibre B. In due course the 3 dB point 10 of FIG. 2 is reached, at which the power output is equally divided between the two fibres. Further extension results in increased coupling and the domain of overcoupling reached. As indicated in FIG. 2 the output from fibre A is diminished until the power is totally transferred to fibre B as represented by points 11. A further extension and increase of coupling brings more power back into the output from fibre A until, after passing through the second 3 dB point 12, power emerges exclusively from the output of fibre A as represented by points 13. After this, a continued increase in extension and coupling starts the whole cycle over again, with the power output oscillating between output from fibre A and output from fibre B.

As discussed in the abovementioned co-pending application, the coupling strength of any particular configuration of coupler depends on the coupler geometry, the V-values of the fibres within the coupling region, and the length of that region. The V-values depend not only upon fibre geometry and refractive indices, but also upon wavelength. Therefore, neglecting the effects of material dispersion, coupling strength can be expected to increase with wavelength and thus couplers can be produced by the differential pulling technique, in view of its good control of the end point, for multiplexing or demultiplexing optical signals. Thus standard production fibre may be employed to produce multiplexers or demultiplexers.

SUMMARY OF THE INVENTION

According to one aspect of the present invention there is provided a polarisation beam splitter/combiner formed from low or zero birefringence single mode optical fibre.

According to another aspect of the present invention there is provided a polarisation insensitive beam splitter/combiner formed from low or zero birefringence single mode optical fibre.

According to a further aspect of the present invention there is provided a method of manufacturing a polarisation beam splitter/combiner, or polarisation insensitive beam splitter/combiner from low or zero birefringence single mode fibre by means of a heating and differential pulling technique and wherein the achieved form birefringence is controlled by the temperature employed.

According to a still further aspect of the present invention there is provided a method manufacturing a polarisation beam splitter/combiner, or a polarisation insensitive beam splitter/combiner, from low or zero birefringence single mode fibre by means of a differential pulling technique including the step of determining the end point thereof by monitoring light from the output ports of the splitter/combiner for the separation of both orthogonal polarisation states, or the occurrence of unpolarised states, respectively.

BRIEF DESCRIPTION OF THE DRAWINGS

Embodiments of the invention will now be described with reference to the accompanying drawings, in which.

DESCRIPTION OF THE PREFERRED EMBODIMENTS

We have now found that by using the differential pulling technique referred to above we can also produce an all-fibre polarisation beam splitter/combiner from standard production fibre, which is of low or zero birefringence. Previous attempts to produce all-fibre polarisation beam splitters/combiners have employed special high birefringence fibre with inherent coupler production problems in terms of control thereof.

Figure 1:
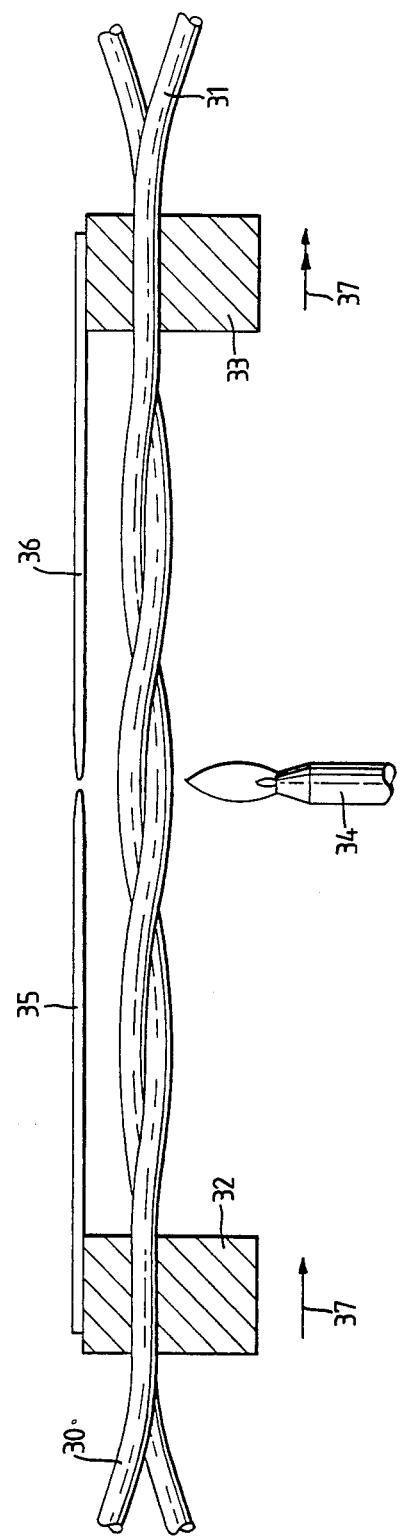
FIG. 1 is a schematic representation of equipment of the differential pulling technique.
Figure 2:
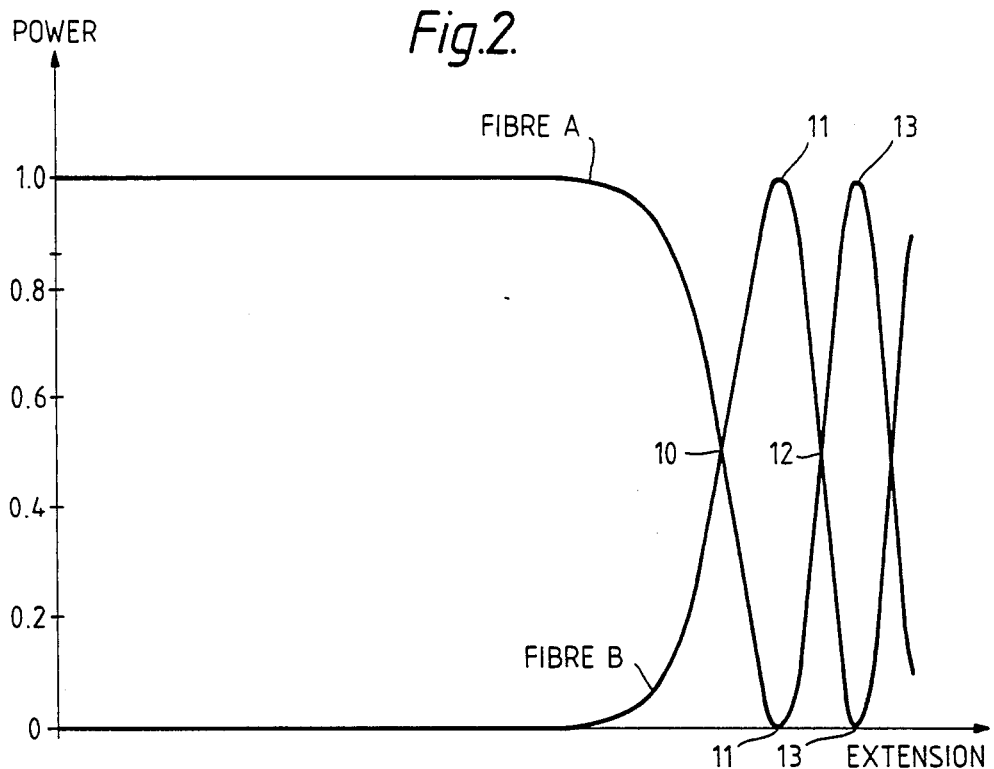
FIG. 2 depicts how the initial coupling between two fibres varies as a function of fibre extension.
Figure 3:
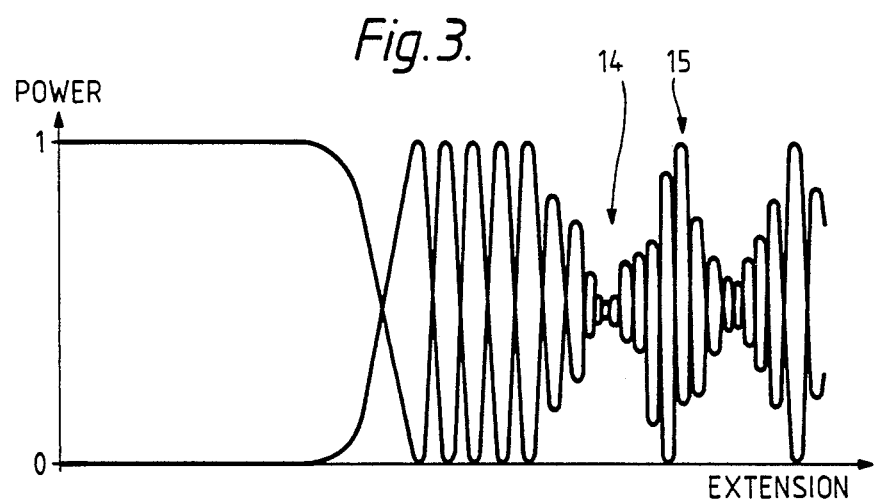
FIG. 3 depicts coupling between two fibres up to a higher degree of fibre extension than indicated in FIG. 2.

We have found that by stretching the twisted fibres, further than required for the required degree of overcoupling for multiplexers, by the differential pulling technique, that is by increasing the coupling still further, a point 14 (FIG. 3) is reached when the orthogonal polarisations of an input beam are split between the two output ports and thus the coupler acts as a polarisation beam splitter/combiner. Still further elongation and higher coupling, from point 15 (FIG. 3), results in the suppression of the effect of polarisation and a coupler acts as a polarisation insensitive beam splitter.

The operation of these polarisation, or polarisation insensitive, beam splitters which were produced from low or zero birefringence standard production fibre relies on an effect associated with the form birefringence exhibited by the fused section of a highly coupled device, which form birefringence can be controlled by correspondingly controlling the temperature employed for the differential pulling technique, the end point of which can be determined by monitoring the light from the output ports for the occurrence of unpolarised states or the separation of both orthogonal polarisation states.

A highly coupled device, in the absence of any birefringence, operates such that the power in one arm thereof varies with the active coupling length Z as $I = I_0 \sin^2 cz$ where c is the coupling constant for modes of the fibres comprising the coupler. In a highly coupled device, where many power transfers occur along the length of the coupler, it is more appropriate to consider the power to be propagating in two low order modes of the whole structure having opposite symmetries. For example, if the (symmetric) fundamental ($B_o$) and the anti-symmetric) first order ($B_1$) modes are present, the power in one arm of the coupler would vary as $$I = I_o \sin^2(B_o - B_1)z$$

where the "power transfers" are now interpreted as phase slippage between the independently propagating modes. Total "power transfer" recurs every "beat length", that is when z is a multiple of $\pi/(B_o - B_1)$. It should be noted that in a fused tapered coupler, the influence of the original fibre cores is negligible. The waveguide is formed by the whole fused structure and its surrounding medium.

Figure 4:
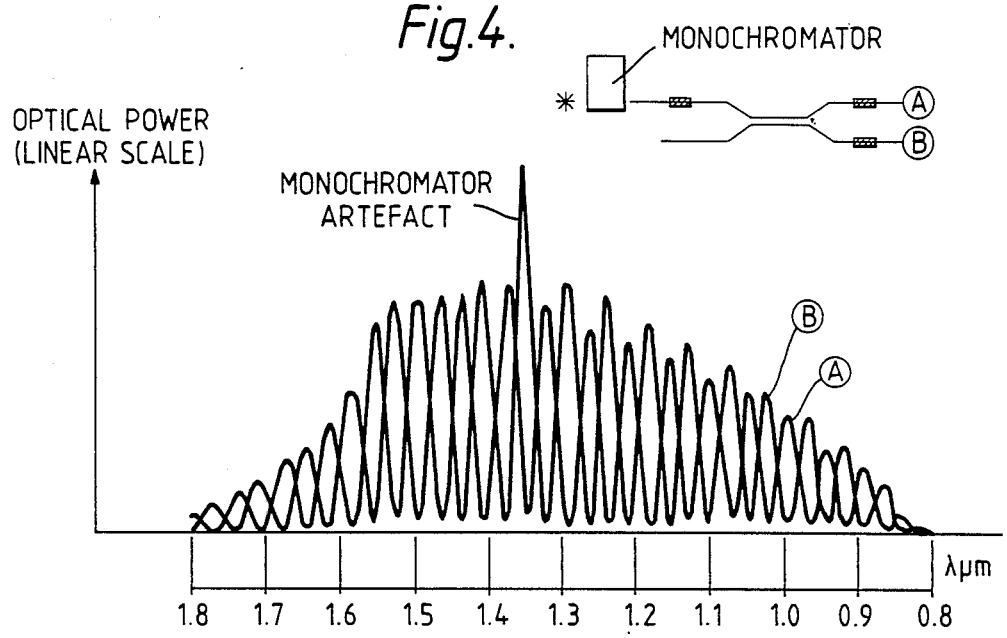
FIG. 4 illustrates the spectral response of a fused single mode fibre directional coupler having low birefringence.

For each mode, B varies approximately inversely with wavelength and thus a highly coupled device exhibits an oscillatory spectral response. FIG. 4 shows the spectral response of a packaged coupler device having more than twenty "beat lengths" at 1.3 μm. The overall envelope of this response is determined by the measurement conditions. The response of the germanium detectors employed to measure the actual response shown in FIG. 4 falls off above 1.5 μm, whilst an order sorting filter cuts in below 0.8 μm.

Figure 5:
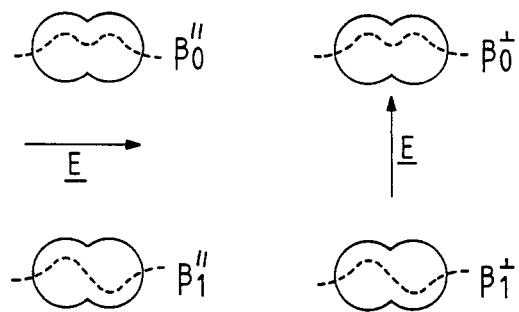
FIG. 5 illustrates the effect of birefringence on the low order normal modes of a fibre directional coupler.
Figure 5:
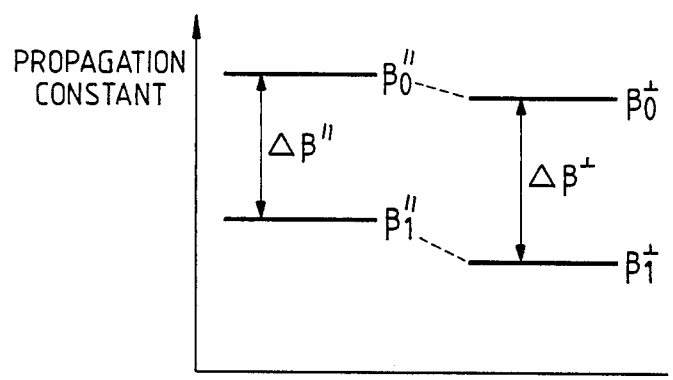

An imposed birefringence will have the effect of splitting the propagation constants of each mode such that the general description of the coupler will involve at least four modes, namely: $B_o \parallel$, $B_o \perp$, $B_1 \parallel$, $B_1 \perp$, as illustrated schematically in FIG. 5. In general, the birefringence splitting experienced by each mode will be different, that is $$(B_o \parallel - B_o \perp) \neq (B_1 \parallel - B_1 \perp)$$

as is also illustrated in FIG. 5.

Thus, each polarisation will exhibit a different beat length, since $$(B_o \parallel - B_1 \perp) \neq (B_o \parallel - B_1 \perp)$$

This means that if the active coupling length can be made such that the number of beat lengths experienced by each polarisation differs by a half, then the device will act as a polarisation beam splitter. This condition can be written concisely as $\Delta B \parallel = \Delta B \perp \pm (\pi/2z)$. Reciprocity ensures that if light of the appropriate polarisation is incident at two input ports then the device will act as a polarisation beam combiner. If the number of beat lengths experienced by each polarisation differs by one complete beat length then the effect of polarisation is completely suppressed, in this case $\Delta B \parallel = \Delta B \perp \pm (\pi/z)$, and a polarisation insensitive beam splitter results.

In a device manufactured as mentioned above by a differential pulling technique from standard production fibre with zero or low intrinsic birefringence rather than from high birefringence fibre, the operation as a polarisation splitter, for example, thus relies on imposed birefringence provided by the form birefringence exhibited by the fused section of a highly coupled device. The fibre used for the device may comprise standard single mode, low or zero birefringence, fibre designed for operation at 1.3 μm and having a cladding diameter of 125 μm, a core radius of 4.5 μm, a λ cutoff 1.2 μm and an equivalent step index profile of Δn=0.0033.

Figure 6:
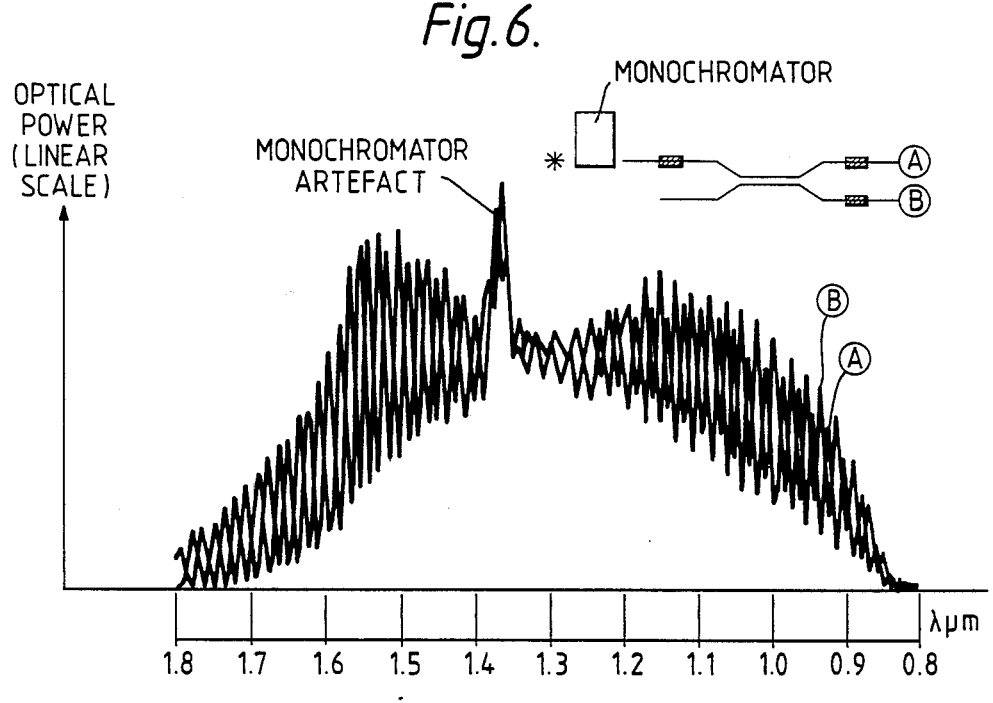
FIG. 6 illustrates the spectral response of a fused single mode fibre directional coupler which is more strongly coupled and exhibits a higher level of birefringence than that whose spectral response is shown in FIG. 3.

The device whose response is shown in FIG. 6 is more strongly coupled than that whose response is shown in FIG. 4. It should be noted than in FIG. 6, unlike FIG. 4, the anticipated rapid oscillations are "quenched" near 1.3 μm. This is because the spectral measurement was made using a white light source with a scanning monochromator and the launched light was therefore nearly unpolarised. The unpolarised light may be decomposed into orthogonal (phase incoherent) components which propagate through the coupler with beat lengths of $\pi/\Delta B\parallel$ and $\pi/\Delta B\perp$. When the condition $\Delta B\parallel = \Delta B\perp \pm (\pi/2z)$ is met, the spectral responses become complementary and thus a measurement of total power from either arm becomes almost wavelength independent.

Figure 7:
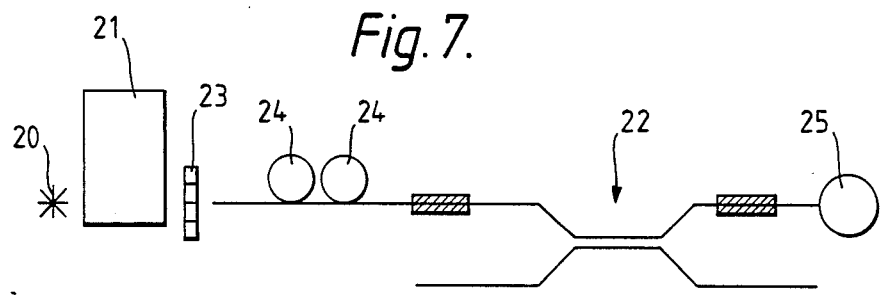
FIG. 7 illustrates an experimental arrangement employed to confirm the operation of the coupler whose spectral response is shown in FIG. 5 as a polarisation beam splitter.
Figure 8:
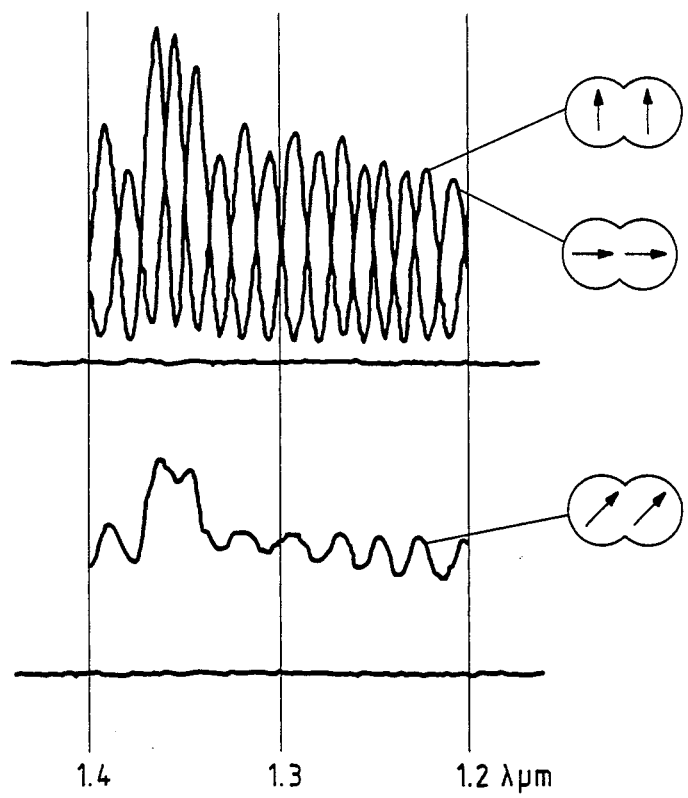
FIG. 8 shows experimental results obtained for different launch conditions.

That the device whose spectral response is shown in FIG. 6 did in fact operate as a polarisation beam splitter was confirmed by means of the experimental arrangement shown in FIG. 7. The output from a spectrometer comprising a white light source 20 and monochromator 21 was fed to a coupler 22 via a linear polariser 23 and two wound fibre quarter wave retarders 24. The retarders allow any state of polarisation to be launched into the coupler. The traces of FIG. 8 were all obtained from output port 25 of coupler 22 for three different launch conditions, also shown schematically in FIG. 8. The traces give an indication of the extinction ratio obtainable and show clearly the complementary spectral responses. A more precise measurement of the extinction ratio made using a semiconductor laser yielded the value 11.7 dB at 1.293 μm.

Devices may be packaged as described in the above-mentioned reference by being encapsulated in a silicone resin in an invar box although, alternatively, air may be employed instead of the silicone resin. In the case of "air" encapsulation, the higher refractive index difference leads to a higher level of form birefringence for a given geometry.

Technical Advantages of the Invention

All-fibre polarisation, or polarisation insensitive, beam splitters/combiners may thus be produced from standard production fibre, which is of low or zero birefringence, by using the differential pulling technique to induce form birefringence, rather than requiring special high birefringence fibre.

We claim:

1. A polarization beam splitter/combiner comprising a pair of low or zero birefringence single mode optical fibres, regions of which have been prepared, twisted together, and stretched and fused together by a heating and differential pulling technique, the twisted together regions being stretched to such an extent that orthogonal polarisations of a beam input to one end of one of the optical fibres are split between the optical fibres.

2. A polarisation insensitive beam splitter/combiner comprising a pair of low or zero birefringence single mode optical fibres, regions of which have been prepared, twisted together, and stretched and fused togehter by a heating and differnetial pulling technique, the twisted together regions being stretched to such an extent that the effect of a polarisation of a beam input to one end of one of the optical fibres is suppressed and the input beam is split between the optical fibres irrespective of the polarisation of the input beam.

3. A method of manufacturing a polarisation beam splitter/combiner from a pair of low or zero birefringence single mode optical fibres including the steps of preparing a respective region of each fibre, twisting the regions together, and stretching and fusing the twisted together regions by employing a heating and differential pulling technique which induces form birefringence such that orthogonal polarisations of a beam input to one end of the optical fibres are split between the optical fibres, and wherein the achieved form birefringence is controlled by controlling the temperature employed for the heating and differential pulling technique.

4. A method of manufacturing a polarisation beam splitter/combiner from a pair of low or zero birefringence single mode optical fibres including the steps of preparing a respective region for each fibre, twisting the regions together, and stretching and fusing the twisted together regions by empolying a heating and differential pulling technique which induces form birefringence such that orthogonal polarisations of a beam input to one end of one of the optical fibres are split between the optical fibres, and including the step of determining an end point of the heating and differential pulling technique by monitoring light from output ports of the splitter/combiner for the separation of orthogonal polarisation states.

5. A method of manufacturing a polarisation insensitive beam splitter/combiner from a pair of low or zero birefringence single mode optical fibres including the steps of preparing a respective region of each fibre, twisting the regions together, and stretching and fusing he twisted togehter regions by employing a heating and differential pulling technique which induces form birefringence such that the effect of a polarisation of a beam input to one end of one of the optical fibres is suppressed and the input beam is split between the optical fibres irrespective of the polarisation of the input beam, and wherein the achieved form birefringence is controlled by controlling the temperature employed for the heating and differential pulling technique.

6. A method of manufacturing a polarisation insensitive beam splitter/combiner from a pair of low or zero birefringence single mode optical fibres including the steps of preparing a respective region of each fibre, twisting the regions together, and stretching and fusing he twisted together regions by employing a heating and differential pulling technique which induces form birefringence such that the effect of a polarisation of a beam input to one end of one of the optical fibres is suppressed and the input beam is split between the optical fibres irrespective of the polarisation of the input beam, and including the steps of detemrining an end point of the heating and differential pulling technique by monitoring light from output ports of the splitter/combiner for the occurrence of unpolarised states.

7. A polarisation beam splitter/combiner comprising a pair of low or zero birefringence single mode optical fibres, the fibres being twisted and stretched and fused together by a heating and differntial pulling technique so as to induce form birefringence such that orthogonal polarisations of a beam input to one end of one of the optical fibres are split between the optical fibres.

8. A polarisation insensitive beam splitter/combiner comprising a pair of low or zero birefringence single mode optical fibres, the fibres being twisted and stretched and fused togehter by a heating and differnetial pulling technique so as to induce form birefringence such that the effect of a polarization of a beam input to one end of one of the optical fibres is suppressed and the input beam is split between the optical fibres irrespective of the polarisation of the input beam.

* * * * *

UNITED STATES PATENT AND TRADEMARK OFFICE
CERTIFICATE OF CORRECTION

PATENT NO. : 4,756,589

DATED : July 12, 1988

INVENTOR(S) : BRICHENO et al

It is certified that error appears in the above-identified patent and that said Letters Patent is hereby corrected as shown below:

Claim 2:

column 5, lines 59-60, "togehter" should be -- together --, and "differnetial" should be -- differential --.

Claim 5:

column 6, line 29, "he" should be -- the --, and "togehter" should be -- together --.

Claim 6:

column 6, line 42, "he" should be -- the --;
line 49, "detemrining" should be -- determining --.

Claim 7:

column 6, line 55, "differntial" should be -- differential --.

Claim 8:

column 6, line 62, "togehter" should be -- together --;
lines 62-63, "differnetial" should be -- differential --.

Signed and Sealed this

Eighth Day of November, 1988

Attest:

DONALD J. QUIGG

Attesting Officer

Commissioner of Patents and Trademarks